Aug. 21, 1962 E. KOTTSIEPER 3,050,275
STEAM DRIVEN HELICOPTER ROTOR HEAD
Filed May 28, 1959 3 Sheets-Sheet 1
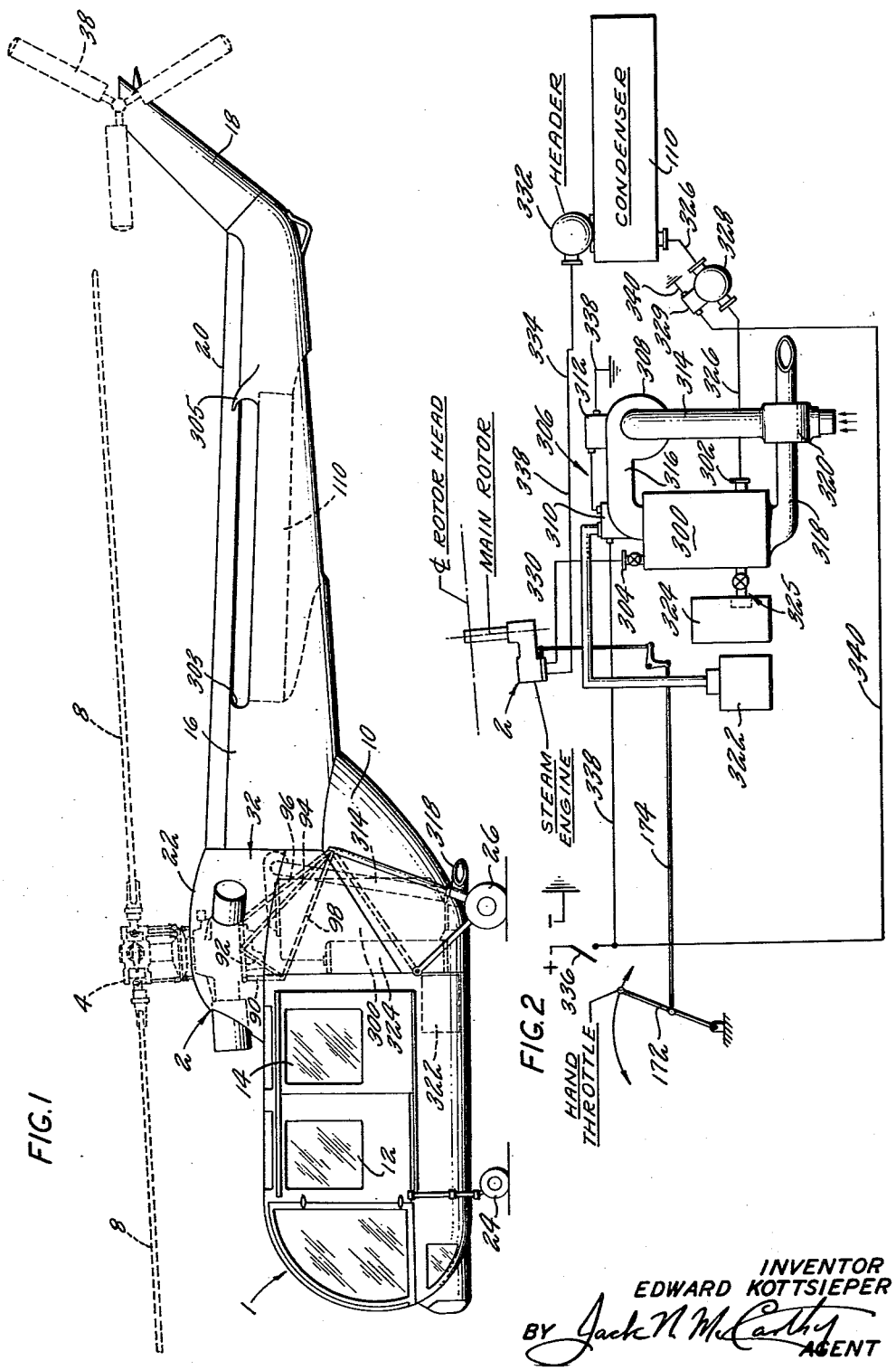
INVENTOR
EDWARD KOTTSIEPER
BY Jack N. McCarthy
AGENT Aug. 21, 1962  E. KOTTSIEPER  3,050,275
STEAM DRIVEN HELICOPTER ROTOR HEAD
Filed May 28, 1959  3 Sheets-Sheet 2

INVENTOR
EDWARD KOTTSIEPER
BY Jack N. McCarthy
AGENT

Aug. 21, 1962 E. KOTTSIEPER 3,050,275
STEAM DRIVEN HELICOPTER ROTOR HEAD
Filed May 28, 1959 3 Sheets-Sheet 3

INVENTOR
EDWARD KOTTSIEPER
BY Jack N. McCarthy
AGENT

3,050,275
STEAM DRIVEN HELICOPTER ROTOR HEAD
Edward Kottsieper, Fairfield, Conn., assignor to United Aircraft Corporation, East Hartford, Conn., a corporation of Delaware
Filed May 28, 1959, Ser. No. 816,593
16 Claims. (Cl. 244—17.11)

This invention relates to a steam driven helicopter.

An object of this invention is to provide a helicopter with a power plant having a minimum amount of noise.

Another object of this invention is to provide a helicopter with a power plant in which the power demand can be kept with no change in r.p.m.

A further object of this invention is to provide an arrangement whereby the power plant and rotor head are mounted by the same casing.

Another object of this invention is to provide driving means for a helicopter rotor blade in which the conventional gear box is eliminated.

A further object of this invention is to provide a condenser lengthwise in the tail cone of a helicopter whereby the air directed downwardly from the helicopter blades provides for movement of the air over the condenser.

Another object of this invention is to provide a helicopter with a reliable power plant and rotor unit.

A further object of this invention is to provide a control system for operating a steam engine on a helicopter.

Other objects and advantages will be apparent from the specification and claims, and from the accompanying drawings which illustrate an embodiment of the invention.

FIG. 1 is a side view of a helicopter showing the relative location of the steam engine and its associated parts;

FIG. 2 is a diagrammatic view of the steam engine and its associated parts;

Figure 3:
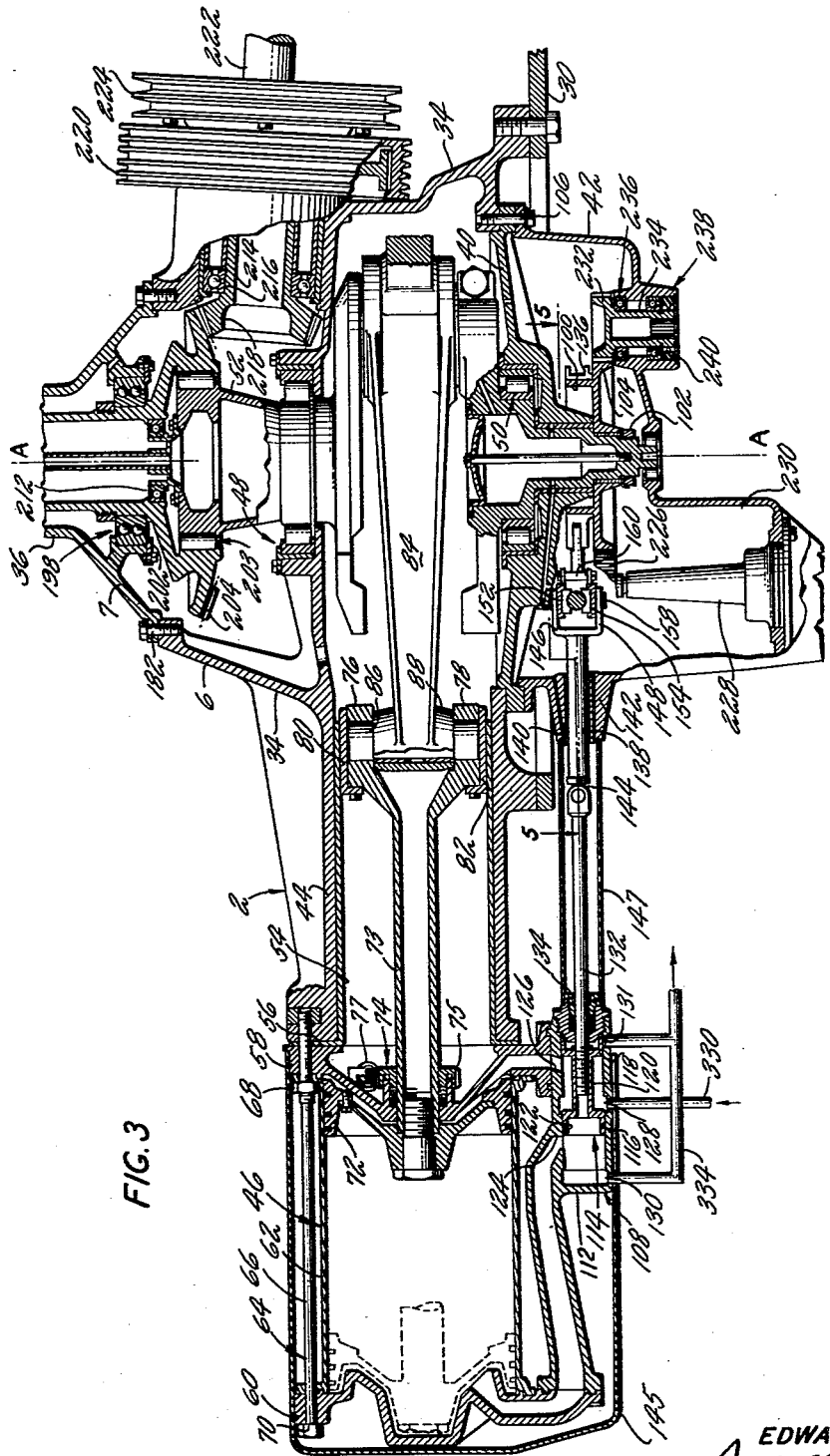
FIG. 3 is a sectional view taken through the lower part of the casing showing the steam engine.
Figure 5:
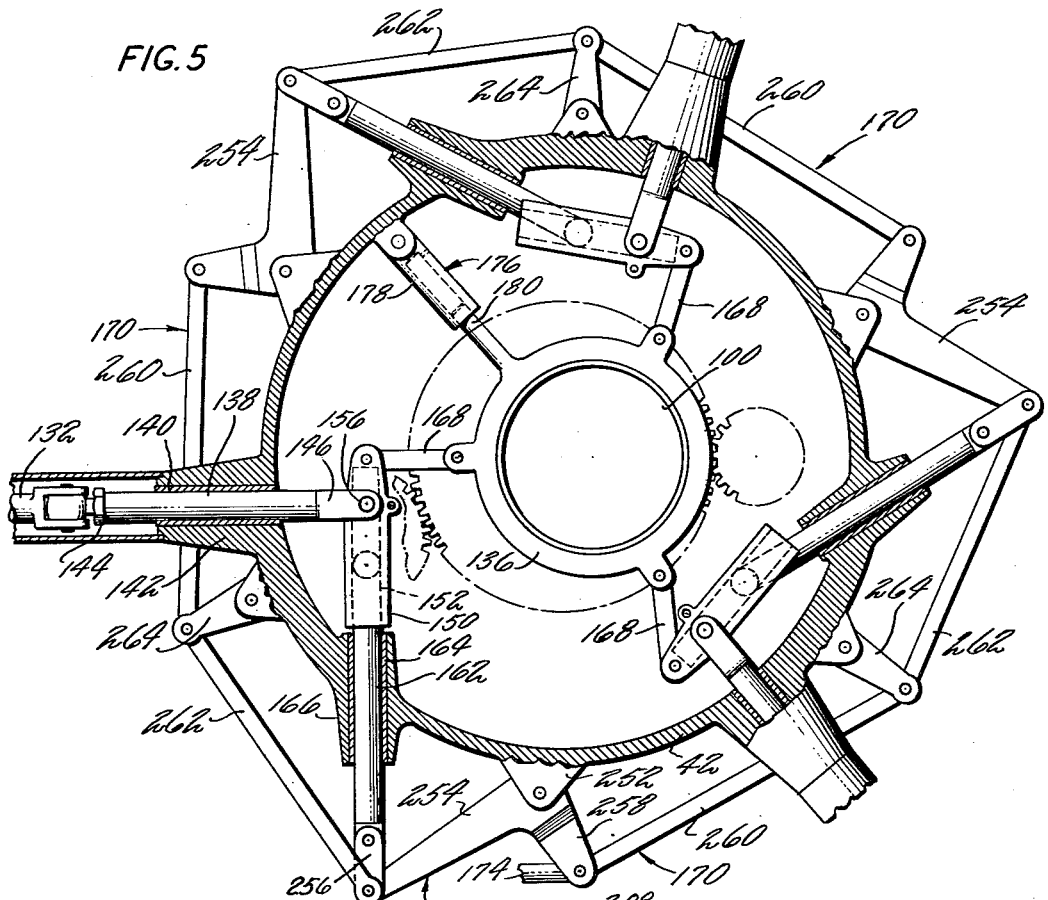
FIG. 5 is a view taken along the line 5—5 on FIG. 3 showing the control means.

As shown in FIG. 1, a helicopter 1 includes a fuselage 10 having a forward pilot compartment 12, a central cargo or passenger compartment 14, and a tail cone 16. A main rotor pylon 22 located above the fuselage 10 and in front of the tail cone 16 houses a steam engine 2. The main rotor head 4 is supported on the upper end of an upright section of the housing 6 of the steam engine 2. The rotor blades 8 are mounted on the rotor head 4 in a conventional manner. A blade mounting system which can be used is shown and described in U.S. Patent No. 2,774,553 to H. T. Jensen for a Damper By-Pass for Lag-Lead Control of Helicopter Rotor Blades and a control for a set of blades is shown and described in U.S. Patent No. 2,811,324 to R. P. Alex for a Turbo-Jet Driven Helicopter.

An anti-torque tail rotor 38 is mounted for rotation about a generally horizontal axis at the aft end of the tail cone 16 on an upstanding pylon 18. In accordance with this invention, the drive for the tail rotor 38 is taken from steam engine 2 and passes through a cover 20 which extends lengthwise down the top of the tail cone 16. The tail rotor drive then extends into an angular gear box and is directed upwardly through the rear pylon 18 to the tail rotor 38. Conventional landing gear are used which include forward wheels 24 and rear wheels 26.

The housing 6 is mounted in the main rotor pylon 22 on a mounting member or ring 30 which is supported by helicopter structure through a mounting link system 32. The mounting member 30 shown has four equally spaced link attaching points. While four attaching points are shown, the mounting member 30 can be mounted on any number of suitable points. Two links are connected to each attaching point. Adjacent links of adjacent attaching points are equal in length, for example, link 90 is equal in length to link 92 and link 94 is equal in length to link 96. Where these links meet, they are fixed to aircraft structure. These meeting points of the various links are further interconnected by rods such as 98 which provide a rigid structure. It is noted that the meeting point of links 94 and 96 is also a point at which a supporting leg of the rear landing gear structure is attached. This structure can be seen in FIG. 1. While only one side of the helicopter is shown, it is to be understood that the mounting link system is similar on the opposite side. This system will support the weight of the engine and rotor while the helicopter is at rest on the ground, will support the helicopter from the mounting member 30 while the helicopter is in flight, and will absorb the torque between the engine and fuselage.

The housing 6 for the steam engine comprises a central case 34, an upwardly extending portion 36, a lower bearing plate 40, and a lower cover plate 42. Central case 34 has three radially extending portions 44 which are spaced equally about the center line A—A of the engine. Cylinder assemblies 46 extend one from each free end of the extending portions 44.

The central case 34 of the housing 6 has a bearing means 48 mounted therein with the center line of said bearing means being arranged coaxially with the axis A—A of the steam engine. Bearing plate 40 of the housing 6 has its outer edge fixed to the edge of an opening in the bottom of the central case 34. This bearing plate 40 has a bearing means 50 supported therein. Bearing means 50 has its center line arranged coaxially with the axis A—A of the steam engine. A crank shaft 52 is supported in the bearing means 48 and 50. The crank throw and counterweights rotate within a cavity formed in the part of the central case portion 34 which is between the bearing means 48 and the bearing means 50.

Portions 44 each have a cross head guide 54 located therein. Each cross head guide has a flange 56 which extends over the free end of its cooperating member 44. A cylinder assembly 46 is fixedly mounted against each flange 56 to a member 44 of the housing 6. Each cylinder assembly comprises an inner end member 58, an outer head 60 and a cylinder barrel 62. These three parts of the cylinder assembly are fixed to the end of its respective member 44 by a plurality of bolt assemblies 64. Each bolt assembly comprises a long bolt 66 which passes through the edge of outer head 60, a flange on the outer end of cylinder barrel 62 and a flange on the inner end of cylinder barrel 62, inner end member 58, cooperating flange 56, and threadably engages a barrel nut on the end of the member 44. A nut 68 is threadably secured to the bolt 66 and engages the outer part of the inner flange on the cylinder barrel. Another nut 70 is threadably secured to the bolt 66 and engages the outer part of the outer head 60.

A piston 72 is mounted in each cylinder assembly 46 for movement therein. A piston rod 73 is fixedly attached to each piston 72 and extends through an opening in its cooperating inner end member 58. A stuffing box 74 is located around each piston rod 73 where it extends out of its inner end member 58 of the cylinder assembly. Each stuffing box has a movable end 75 which can vary the pressure applied to the stuffing in the box. Each movable end 75 is threadably mounted and has teeth around its outer periphery which are engaged by the threads of a worm 77. Worm 77 has an adjustment rod extending externally of the inner end member 58. Movement of this adjustment rod rotates the worm 77 which in turn rotates the movable end about its threaded attachment.

The free end of each piston rod located in its cooperating radially extending portion 44 is formed as a bifurcated portion having two tines 76 and 78. Cross head members 80 and 82 are fixed to the tines 76 and 78, respectively, of each piston rod and engage the cooperating cross head guide to provide an even longitudinal movement of the free end of each piston rod 74 within its radially extending portion 44.

A master rod 84 has one end mounted about the crank shaft throw to permit relative rotary motion therebetween while the other end of said master rod 84 is pivotally mounted between the tines 76 and 78 of one piston rod. A pin 86 extends through a pin receiving portion 88 of the master rod 84 and into the tines 76 and 78. Two connecting rods are each pivotally attached to the end of the master rod 84 mounted on the crank shaft throw and extend into their cooperating radially extending portions 44. Each connecting rod is attached to its respective piston rod in the same manner as the master rod is attached to its piston rod.

The lower end of the crank shaft 52 extends below bearing means 50 and projects below the underside of the bearing plate 40. An eccentric member 100 is fixed to the portion of crank shaft 52 where it extends below bearing plate 40. The eccentric member is held between a shoulder on the crank shaft 52 and a nut 102 which is threadably secured on said crank shaft adjacent its end. The eccentric 100 has a gear 104 formed integrally therewith for a purpose to be hereinafter described. Cover plate 42 encloses the eccentric 100 and is fixedly attached to the outer edge of bearing plate 40. In the construction shown, a plurality of bolts 106 hold the central case 34, lower bearing plate 40, and lower cover plate 42 together.

A piston valve 108 is provided for directing steam to one side or the other of each piston 72 while connecting the opposite side to exhaust. Each valve 108 comprises a cylinder member 112 and a piston 114. The piston 114 is constructed having two lands 116 and 118 with a stem section 120 therebetween and the cylinder member 112 is constructed having a bore 122 in which the lands 116 and 118 are slideable. Two ports 124 and 126 intersect the surface of bore 122 and are spaced apart so that the lands 116 and 118 cover them respectively when the piston is at its midpoint. Port 126 is connected to the inner end of its cooperating cylinder assembly through a passageway formed in the inner end member 58. Port 124 is connected to the outer end of its cooperating cylinder assembly through a passageway formed in the cylinder member 112 and in the outer head 60. Each cylinder member 112 may be attached to its respective inner end member 58 and outer head 60 by any satisfactory means desired.

Steam is admitted to the annular space around the stem section 120 of each of the piston valves 108 through an opening 128. An opening 130 adjacent one end of each cylinder member 112 and an opening 131 adjacent the other end permits exhaust to pass from the valve.

A valve stem 132 extends from one end of each piston 114 toward the inner part of the steam engine 2. Each cylinder member 112 is threadably mounted in position at its inner end and has a stuffing box formed about the valve stem which passes therethrough. A nut 134 forms one end of the stuffing box and provides for adjustment so that the force applied to the stuffing can be controlled. It can be seen that the movement of a valve stem of the steam engine will control the amount of a steam permitted to enter either end of its cooperating cylinder assembly and will control the time at which it is admitted. It also controls the exhaust from either end of its cooperating cylinder assembly and the time at which exhaust is made. To provide for this movement of each of the valve stems 132, they are connected to an eccentric strap 136 by a linkage which provides the pilot with a control over the positioning of said piston valves 108.

The free end of each valve stem 132 is connected to a push rod 138 which is mounted for axial movement in a bearing guide 140 which is in turn fixed in a boss 142 of the lower cover plate 42. The connection of the free end of valve stem 132 to the push rod 138 provides adjustment means 144 for controlling the fixed length of the valve stem and push rod combination.

A shell 145 covers each cylinder assembly along with its associated piston valve. Insulation can be placed between each of the shells 145 and its cylinder assembly. A tubular device 147 covers each valve stem and is fixed at one end to its cooperating stuffing box and at its other end to the boss 142. The tubular device 147 is shown having two telescoping portions with a locking section for maintaining them at a fixed length.

The end of each push rod 138 which projects into lower cover plate 42 is formed as a bifurcated portion having an upper tine 146 and a lower tine 148. Mounted between each set of tines is a position transmitting lever 150 formed having upper and lower track members 152 and 154. The upper track member 152 is pivotally mounted to the upper tine 146 by a stud 156 which projects upwardly therefrom into a hole located in the upper tine. The lower track member 154 is pivotally mounted to the lower tine 148 by a stud 158 which projects downwardly therefrom into a hole located in the lower tine. The upper and lower tracks are spaced apart by a spacing member 160 which is positioned between two projections on each of the upper and lower track members. A bolt extends through the projections and spacing member 160 to hold the unit together.

Extending through the lower cover plate 42 is control rod 162 mounted for reciprocation in a bearing 164 fixed in a boss 166. There is a control rod 162 and related assembly for each valve 108. The end of the control rod 162 which projects into the lower cover plate 42 has a wheel mounted in a recess on the top and bottom thereof for engagement with the upper and lower tracks, respectively, of position transmitting lever 150. It can be seen that movement of control lever 162 provides a moveable fulcrum for lever 150. The free end of each lever 150 is connected to the eccentric strap 136 by a link 168. Link 168 is pivotally attached to the eccentric strap. The attachments to the eccentric strap by the three links 168 are spaced equally about the strap.

Each end of each control rod 162 which extends to the exterior of the lower cover plate 42 is connected one to the other by a linkage system 170 which provides for equal movement of each of the control rods 162 simultaneously. Linkage system 170 comprises a bell crank 250 pivotally mounted adjacent each boss 166 to a bracket 252. One arm 254 of each bell crank lever 250 is attached to the free end of its cooperating control rod 162 by a link 256. Each link 256 is pivotally connected at one end to the free end of control rod 162 and pivotally connected at its other end to the free end of its arm 254. Each bell crank lever has another arm 258 which is attached to the free end of the nearest arm 254 of the adjacent bell crank lever 250 by two links 260 and 262 which are connected near their mid-point to the outer end of an idling lever 264. A hand throttle 172 is provided in the pilot's compartment so that he can control the position of the control rods 162 and therefore control the movement of the valves 108 by the eccentric 100. The hand throttle 172 is connected to the linkage 170 by another linkage system 174, shown schematically in FIG. 2. While no specific linkage is shown, any operative actuating mechanism can be used between the throttle 172 and the linkage system 170 so that it is moved in its intended mode of operation.

The eccentric strap is connected to the inner side of the lower cover plate 42 by cylinder and piston assembly 176 to prevent the rotation of the strap. A cylinder 178 is pivoted to the plate 42 and projects radially inwardly toward the eccentric strap. A piston member 180 is mounted in said cylinder for reciprocation therein and has its free end fixedly connected to said eccentric strap 136. An opening is provided at the base of the cylinder to prevent a fluid lock between the piston and cylinder. In FIG. 3 valve 108 is shown to the right of its midpoint and eccentric 100 is shown in its full right position.

Upwardly extending portion 36 of the housing 6 is generally tubular in shape and is bolted at its lower end by a flange 7 to the top of central case 34 by bolts 182. A chamber is formed between flange 7 of portion 36 and the bearing means 48 of the central case 34. The upper end of the crank shaft 52 extends above bearing means 48 and projects into the chamber just referred to.

The main rotor head 4 includes a cylindrical portion 184 which is rotatably mounted around the top of upwardly extending portion 36. This rotatable movement is provided by two bearing means 186 and 188. The inner race of bearing means 188 is positioned between a sleeve 190 located below said race and around the exterior of upwardly extending portion 36 and a spacer sleeve 192 located above said race and around the exterior of upwardly extending portion 36. Sleeve 190 has its lower edge positioned against an abutment on the portion 36. The inner race of bearing means 186 is positioned on top of spacer sleeve 192 and a spanner nut threadably engages the upper end of portion 36 and holds sleeve 190, the inner race of bearing means 188, spacer sleeve 192 and the inner race of bearing means 186 in place on the upwardly extending portion 36.

The outer race of bearing means 188 is fixedly mounted with respect to cylindrical portion 184 between an abutment on the inner surface of cylindrical portion 184 and an inwardly extending flange which is bolted to the lower part of the cylindrical portion 184. The outer race of bearing means 186 engages the inner surface of cylindrical portion 184 and is located below an abutment thereon.

Figure 4:
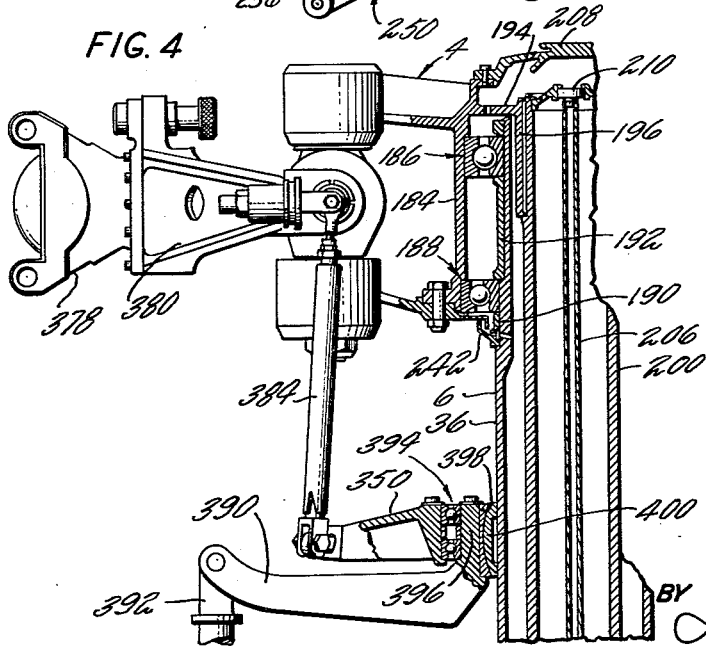
FIG. 4 is a sectional view taken through the upper part of the casing showing the rotor thereon.

Mounting means for each blade 8 extends radially outwardly from cylindrical portion 184. The particular means by which blades are attached to cylindrical portion 184 do not form part of applicant's invention. As seen in FIG. 4, a blade attaching sleeve 378 is provided for each blade and has a blade pitch changing horn 380 projecting therefrom. The free end of each horn 380 is attached to a point on a rotating swash plate 350. Rotating swash plate 350 is mounted for rotation on stationary swash plate member 390 by bearing means 394. Bearing means 394 is fixed between the inner periphery of rotating swash plate 350 and the outer surface of a cylindrical member 396 which extends upwardly from rotating swash plate member 390.

The inner surface of cylindrical member 396 has a socket member 398 fixed thereto. This socket member 398 engages the ball-shaped surface of a member 400 which is slidably mounted on upwardly extending portion 36 of housing 6. Conventional push-pull rods are attached to the stationary swash plate member 390 to either tilt the stationary and rotating swash plates to provide for cyclic pitch control, or to move the stationary and rotating swash plate together axially on housing 6 to provide for collective pitch control. One of the push-pull rods 392 is shown in FIG. 4.

An annular flange 194 extends inwardly from the upper part of cylindrical portion 184 and extends over the top of upwardly extending portion 36. The inner periphery of flange 194 is attached to a tubular section 196 which projects downwardly into tubular portion 36. Section 196 is splined about its inner surface.

A drive shaft 200 is mounted for rotation in upwardly extending portion 36 by bearing means 198 located between the lower part of the drive shaft 200 and flange 7. The inner race of the bearing means is fixed to shaft 200 between an abutment thereon and a spanner nut while the outer race is fixed to the flange 7 between an abutment fixed thereto and a washer member 202 bolted to flange 7. The upper end of crank shaft 52 which extends above bearing means 48 has a free wheeling connection 203 with the end of shaft 200 below bearing means 198. This free wheeling connection is a conventional one which permits the engine to drive the drive shaft 200, but will not transmit torque from the drive shaft to the engine. A tail rotor drive gear 204 is integrally fixed to the lower end of drive shaft 200 adjacent the free wheeling connection 203. The upper end of drive shaft 200 is splined, said splines engaging the splined inner surface of section 196.

Lubricant conveying tube 206 is connected to the upper free end of crank shaft 52 to convey a lubricant to a chamber formed at the top of the rotor head 4 between flange 194 and a cover plate 208. This tube is mounted for relative movement with drive shaft 200 by bearing means 210 and 212.

Projecting rearwardly from central case 34 is a short shaft 214 which is mounted for rotation in said case by bearing means including a roller bearing 216 located at its forward part and a second roller bearing located adjacent its other end (not shown). The end of shaft 214 in case 34 has a gear 218 thereon which engages tail rotor drive gear 204. The end of shaft 214, which projects externally from case 34, has a rotor brake 220 adjacent thereto along with means for connecting it to tail rotor drive shaft 222. Tail rotor drive shaft 222 extends through cover 20 down the top of the tail cone 16 to drive the tail rotor in a conventional manner, as set forth hereinbefore. A pulley 224 having V-grooves is also driven by shaft 214. This pulley provides a drive for a generator.

Gear 104 referred to before as being formed integrally with eccentric 100 engages a gear 226 to drive a lubricating pump 228 located in a sump 230. Sump 230 is formed in lower cover plate 42. Gear 104 also engages a gear 232 which is connected to an accessory drive shaft 234. Accessory drive shaft 234 is mounted for rotation in lower cover plate 42 by a bearing means including bearing assemblies 236 and 238. A seal 240 is provided between the cover plate 42 and the accessory drive shaft 234.

To provide proper lubrication, lubricating passageways pass from the pump 228 to the interior of the crank shaft 52 for distribution to the crank shaft and its associated parts. Lubricant passes through the crank shaft 52 into the lubricant conveying tube 206. This tube carries the lubricant to the upper end of drive shaft 200, from this point the lubricant is permitted to flow down the interior of drive shaft 200 and into the cylindrical portion 184. The lubricant directed into cylindrical portion 184 is collected after it has passed over bearing means 186 and 188 by an outwardly extending flange member 242 on sleeve 190. An inwardly extending lip extends from the flange which is bolted to the lower part of the cylindrical portion 184 to aid in directing lubricant into flange 242. A passageway permits the lubricant caught by flange 242 to pass into upwardly extending portion 36. Lubricant passes downwardly through portion 36 and drive shaft 200 into central case 34, lubricating the various bearing means and free wheeling connection on its way to the sump.

To provide steam for the steam engine 2, a boiler 300 is provided having an inlet 302 and an outlet 304. Inlet 302 and outlet 304 are connected within the boiler by a tube formed so as to provide a large surface area for contact with the heat formed within the boiler. The heat referred to is provided by a burner apparatus 306 comprising a blower 308 and a fuel control and ignition unit 310. The blower 308 is driven by an electric blower motor 312 and unit 310 includes a conventional ignitor for this type of engine. The blower 308 has an inlet pipe 314 and an outlet pipe 316. The outlet pipe 316 is connected to the fuel control and ignition unit and it is at this point that the fuel-air mixture is formed and then ignited. This heat then passes over the tube within the boiler 300 and the gases are exhausted through an exhaust pipe 318 at the bottom of the boiler 300.

To preheat the air admitted to the blower 308 through inlet pipe 314, the inlet pipe 314 is connected to a manifold 320 which surrounds exhaust pipe 318. A fuel tank 322 is connected to the unit 310 to direct fuel thereto. A water tank 324 is provided to make up for any loss of water in the system. A pump and valve unit 325 connects the water tank to the tube in the boiler adjacent inlet 302. A condenser 110, located lengthwise in the tail cone 16, has its outlet connected to the inlet 302 of boiler 300 by a conduit 326. Tail cone 16 has an opening 303 for entry of air over the condenser 110. A scoop shaped member 305 is provided on each side of cover 20 at the rear of opening 303 and directs air downwardly due to forward motion of the helicopter. Air from the downwash of the rotor passes directly over the condenser 110. A pump 328 is located in conduit 326. This pump is operated by an electrical motor 329.

The outlet 304 of boiler 300 is connected to each opening 128 of the valves 108 by a conduit 330. This directs steam to the annular space around the stem section 120 of each of the piston valves 108. Openings 130 and 131 of each valve 108 are connected to a header 332 by a conduit 334. The outlet of header 332 is connected to the inlet of condenser 110.

To place the steam engine into operation, a switch 336 is provided which, when placed in its "closed" position, directs current to the unit 310 and motor 312 through electrical conduit 338. This starts blower 308 and permits an air-fuel mixture to be formed and ignited. A current is also permitted to pass to motor 329 through electrical conduit 340 which places pump 328 in operation. Many refinements may be made to this operating system which do not form part of this invention. While one means has been disclosed for producing steam, other means can be used such as solar energy and atomic energy.

It is to be understood that the invention is not limited to the specific description above or to the specific figures, but may be used in other ways without departure from its spirit as defined by the following claims.

I claim:

1. A helicopter having in combination, a body, a steam engine, said engine having a casing, said casing having a section which projects upwardly therefrom, a rotor, said rotor being mounted on said upwardly projecting section of said casing, a torque transmitting shaft being supported in said upwardly projecting section, means fixing the upper end of said shaft to said rotor so that they move together, a crank shaft supported in said casing, means connecting said crank shaft to said torque transmitting shaft so that said crank shaft rotates said torque transmitting shaft at its own speed, and means mounting said casing to said helicopter body.

2. A helicopter having in combination, a body, a steam engine, said engine having a casing, said casing having a section which projects upwardly therefrom, a rotor, said rotor being mounted on said upwardly projecting section of said casing, blades on said rotor head, said blades being mounted for pitch changing movement, actuating means for cyclicly changing the pitch of said blades, said actuating means being universally mounted on said upwardly projecting section, a torque transmitting shaft being supported in said upwardly projecting section, means fixing the upper end of said shaft to said rotor so that they move together, a crank shaft supported in said casing, means connecting said crank shaft to said torque transmitting shaft so that said crank shaft rotates said torque transmitting shaft at its own speed, and means mounting said casing to said helicopter body.

3. A helicopter having in combination, a body, a steam engine, said engine having a casing, said casing having a section which projects upwardly therefrom, a rotor, said rotor being mounted on said upwardly projecting section of said casing, a torque transmitting shaft being supported in said upwardly projecting section, means fixing the upper end of said shaft to said rotor so that they move together, a crank shaft supported in said casing, means connecting said crank shaft to said torque transmitting shaft so that torque will be transmitted only from said crank shaft to said torque transmitting shaft, said crank shaft rotating said torque transmitting shaft at its own speed, and means mounting said casing to said helicopter body.

4. A helicopter having in combination, a body, a steam engine, said engine having a casing, said casing having a section which projects upwardly therefrom, a main rotor, a tail rotor, said main rotor being mounted on said upwardly projecting section of said casing, a torque transmitting shaft being supported in said upwardly projecting section, means fixing the upper end of said shaft to said motor rotor so that they move together, a crank shaft supported in said casing, an enlarged portion on the lower end of said torque transmitting shaft, the outer part of said enlarged portion being formed as a gear, means connecting said gear to said tail rotor to transmit torque therebetween, said enlarged portion having an opening therein, said crank shaft having one end extending into the opening in said enlarged portion, means connecting said end of said crank shaft to the enlarged portion of said torque transmitting shaft so that torque will be transmitted only from said crank shaft to said torque transmitting shaft, said crank shaft rotating said torque transmitting shaft at its own speed, and means mounting said casing to said helicopter body.

5. A helicopter having in combination, a body, a steam engine, means controlling the flow of steam to said engine, said engine having a casing, said casing having a section which projects upwardly therefrom, a rotor, said rotor being mounted on said upwardly projecting section of said casing, a torque transmitting shaft being supported in said upwardly projecting section, means fixing the upper end of said shaft to said rotor so that they move together, a crank shaft supported in said casing, said controlling means being connected to said crank shaft, means connecting said crank shaft to said torque transmitting shaft so that torque will be transmitted only from said crank shaft to said torque transmitting shaft, said crank shaft rotating said torque transmitting shaft at its own speed, and means mounting said casing to said helicopter body.

6. A helicopter having in combination, a body, a steam engine, said engine having a casing, a rotor head, rotor blades on said rotor head, said rotor head being mounted on said casing, means mounting said casing to said body, said body having a tail cone projecting substantially horizontally therefrom, and a condenser for said steam engine, said condenser being located in said tail cone, said tail cone having an opening therein which has an effective area facing the underside of said rotor blades.

7. A helicopter having in combination, a body, a steam engine, said engine having a casing, a rotor head, rotor blades on said rotor head, said rotor head being mounted on said casing, means mounting said casing to said body, said body having a tail cone projecting substantially horizontally therefrom, steam producing means, means for directing steam to said engine, a condenser for said steam engine, means for directing exhaust from said steam engine to said condenser, and means for directing condensate to said steam producing means.

8. A helicopter having in combination, a body, a steam engine, said engine having a casing, a rotor head, rotor blades on said rotor head, said rotor head being mounted on said casing, means mounting said casing to said body, said body having a tail cone projecting substantially horizontally therefrom, a condenser for said steam engine, said condenser being located in said tail cone, and steam producing means for said steam engine, said steam producing means being located under said steam engine.

9. A helicopter having in combination, a body, a steam engine having a plurality of pistons, said engine having a casing, said casing having a section which projects upwardly therefrom, a crankshaft supported in said casing, said crankshaft having an extension extending into said upwardly projecting section, a rotor, said rotor being mounted on said upwardly projecting section of said casing, means drivingly connecting said extension to said rotor, means mounting said casing to said helicopter, an eccentric member rotatably mounted on said crankshaft, a strap positioned around said eccentric member, means holding said strap against rotation, valve means mounted externally of said casing for controlling steam to and from each piston, each valve means having a stem which extends into said casing, and means connecting the free end of each stem to said strap.

10. A helicopter having in combination, a body, a steam engine having a plurality of pistons, said engine having a casing, said casing having a section which projects upwardly therefrom, a crankshaft supported in said casing, said crankshaft having an extension extending into said upwardly projecting section, a rotor, said rotor being mounted on said upwardly projecting section of said casing, means drivingly connecting said extension to said rotor, means mounting said casing to said helicopter, an eccentric member rotatably mounted on said crankshaft, a strap positioned around said eccentric member, means holding said strap against rotation, valve means mounted externally of said casing for controlling steam to and from each piston, each valve means having a stem which extends into said casing, and means connecting the free end of each stem to said strap, each of said last named means being moveable to change the stroke of the stem attached thereto.

11. A helicopter having in combination, a body, a steam engine having a plurality of pistons, said engine having a casing, said casing having a section which projects upwardly therefrom, a crankshaft supported in said casing, said crankshaft having an extension extending into said upwardly projecting section, a rotor, said rotor being mounted on said upwardly projecting section of said casing, means drivingly connecting said extension to said rotor, means mounting said casing to said helicopter, an eccentric member rotatably mounted on said crankshaft, a strap positioned around said eccentric member, means holding said strap against rotation, valve means mounted externally of said casing for controlling steam to and from each piston, each valve means having a stem which extends into said casing, a pivoted lever mounted in said casing for each stem, the free end of each stem being connected to its lever, and means connecting each of said levers to said strap.

12. A helicopter having in combination, a body, a steam engine having a plurality of pistons, said engine having a casing, said casing having a section which projects upwardly therefrom, a crankshaft supported in said casing, said crankshaft having an extension extending into said upwardly projecting section, a rotor, said rotor being mounted on said upwardly projecting section of said casing, means drivingly connecting said extension to said rotor, means mounting said casing to said helicopter, an eccentric member rotatably mounted on said crankshaft, a strap positioned around said eccentric member, means holding said strap against rotation, valve means mounted externally of said casing for controlling steam to and from each piston, each valve means having a stem which extends into said casing, a pivoted lever mounted in said casing for each stem, the free end of each stem being connected to its lever, means connecting each of said levers to said strap, each of said pivoted levers having a moveable pivot, and pilot operable means for moving each pivot to change the stroke of the stem attached thereto.

13. A helicopter having in combination, a body, a steam engine having a plurality of pistons, said engine having a casing, said casing having a section which projects upwardly therefrom, a crankshaft supported in said casing, said crankshaft having an extension extending into said upwardly projecting section, a rotor, said rotor being mounted on said upwardly projecting section of said casing, means drivingly connecting said extension to said rotor, means mounting said casing to said helicopter, an eccentric member rotatably mounted on said crankshaft, a strap positioned around said eccentric member, means holding said strap against rotation, valve means mounted externally of said casing for controlling steam to and from each piston, each valve means having a stem which extends into said casing, a pivoted lever mounted in said casing for each stem, the free end of each stem being connected to its lever, means connecting each of said levers to said strap, each of said pivoted levers having a moveable pivot, and pilot operable means for moving each pivot to change the stroke of the stem attached thereto, said pilot operable means including a linkage extending around said casing to move said pivots together.

14. A helicopter having in combination, a body, a steam power plant, said power plant having a casing, a rotor head, rotor blades on said rotor head, said rotor head being mounted on said body, means for driving said rotor head by said power plant, means mounting said casing to said body, said body having a tail cone projecting substantially horizontally therefrom, and a condenser for said steam power plant, said condenser being located in said tail cone, said tail cone having an opening therein which has an effective area facing the underside of said rotor blades.

15. A helicopter having in combination, a body, a steam power plant, said power plant having a casing, a rotor head, rotor blades on said rotor head, said rotor head being mounted on said body, means for driving said rotor head by said power plant, means mounting said casing to said body, said body having a tail cone projecting substantially horizontally therefrom, steam producing means, means for directing steam to said power plant, a condenser for said steam power plant, means for directing exhaust from said steam power plant to said condenser, and means for directing condensate to said steam producing means.

16. A helicopter having in combination, a body, a steam power plant, said power plant having a casing, a rotor head, rotor blades on said rotor head, said rotor head being mounted on said body, means for driving said rotor head by said power plant, means mounting said casing to said body, said body having a tail cone projecting substantially horizontally therefrom, a condenser for said steam power plant, said condenser being located in said tail cone, and steam producing means for said steam power plant, said steam producing means being located under said steam power plant.

References Cited in the file of this patent

UNITED STATES PATENTS

| | | |
|---|---|---|
| 1,047,266 | Mees | Dec. 17, 1912 |
| 1,845,288 | Knox | Feb. 16, 1932 |
| 1,848,389 | Sikorsky | Mar. 8, 1932 |
| 1,916,956 | Lake | July 4, 1933 |
| 2,053,078 | Hathorn | Sept. 1, 1936 |
| 2,165,453 | Chilton et al. | July 11, 1939 |
| 2,539,960 | Marchant et al. | Jan. 30, 1951 |
| 2,615,657 | Young et al. | Oct. 28, 1952 |
| 2,673,696 | Pullin et al. | Mar. 30, 1954 |
| 2,727,577 | De Muth | Dec. 20, 1955 |
| 2,739,769 | Rogers | Mar. 27, 1956 |
| 2,795,110 | Chamberlin | June 11, 1957 |
| 2,951,471 | Hill | Sept. 6, 1960 |